(No Model.) 4 Sheets—Sheet 2.
L. H. WATTLES.
MOTOCYCLE.
No. 597,042. Patented Jan. 11, 1898.
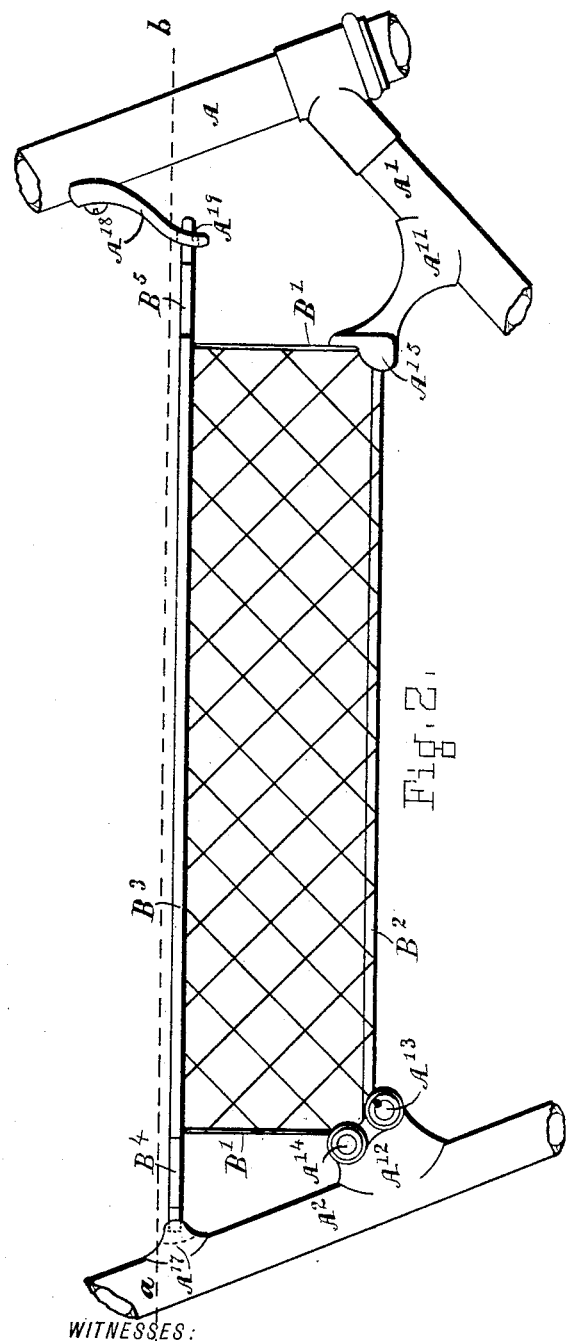
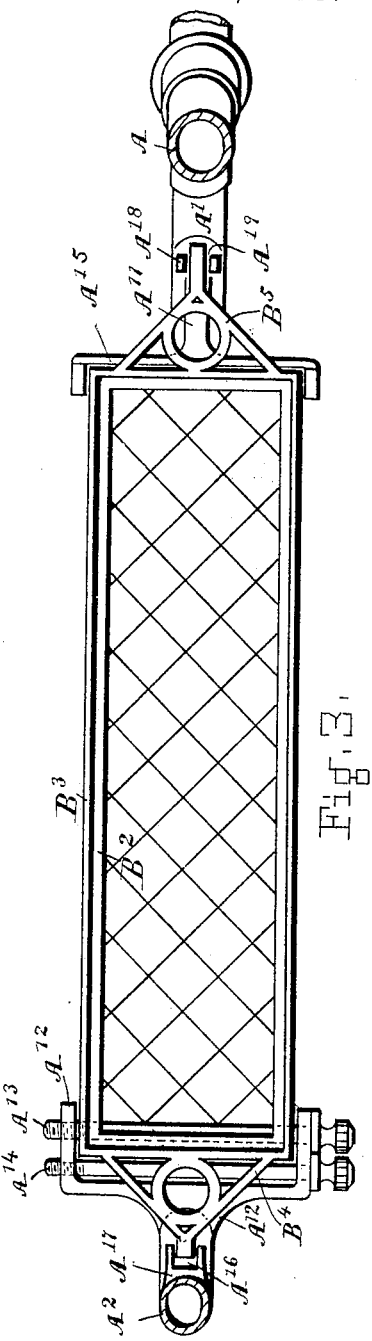
WITNESSES:
James A. McBain
B. C. Davis
INVENTOR
Luther H. Wattles.
BY
Thomas W. Gaynor.
ATTORNEY.
THE NORRIS PETERS CO., PHOTO-LITHO., WASHINGTON, D. C.

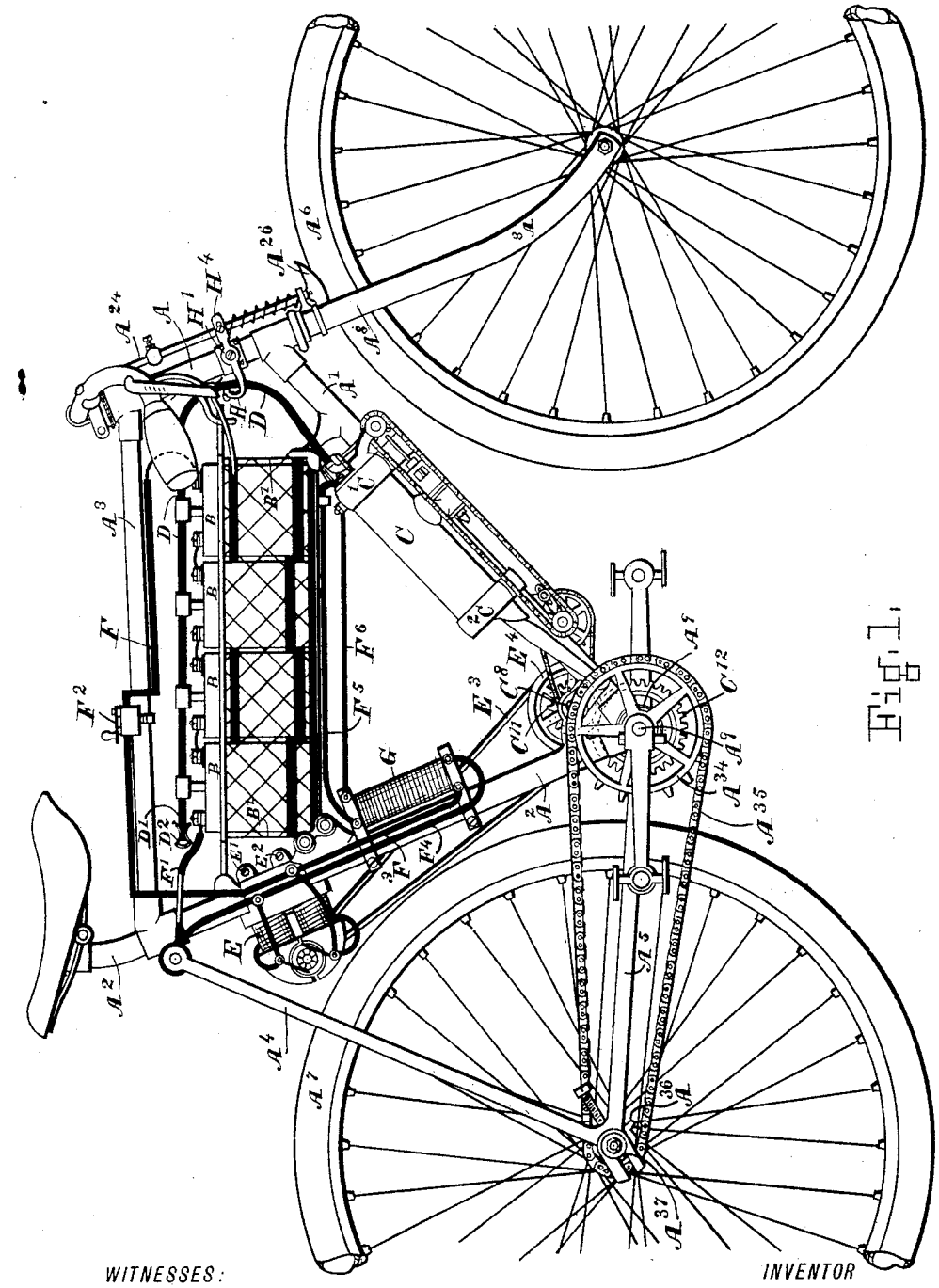

(No Model.)  4 Sheets—Sheet 3.
L. H. WATTLES.
MOTOCYCLE.

No. 597,042. Patented Jan. 11, 1898.

WITNESSES:
James A. McBain
B. C. Davis

INVENTOR
Luther H. Wattles
BY
Thomas F. Gaynor
ATTORNEY.

(No Model.) 4 Sheets—Sheet 4.

L. H. WATTLES.
MOTOCYCLE.

No. 597,042. Patented Jan. 11, 1898.

WITNESSES:
James A. McBain
B. C. Davis

INVENTOR
Luther H. Wattles.
BY
Thomas F. Saynor
ATTORNEY.

UNITED STATES PATENT OFFICE.

LUTHER H. WATTLES, OF PROVIDENCE, RHODE ISLAND, ASSIGNOR, BY DIRECT AND MESNE ASSIGNMENTS, OF THREE-FOURTHS TO THE WATTLES STEAM AND GAS ENGINE COMPANY, OF SAME PLACE, AND BYRON C. DAVIS, OF BROOKLYN, NEW YORK.

MOTOCYCLE.

SPECIFICATION forming part of Letters Patent No. 597,042, dated January 11, 1898.

Application filed December 7, 1895. Serial No. 571,338. (No model.)

*To all whom it may concern:*

Be it known that I, LUTHER H. WATTLES, a citizen of the United States, and a resident of Providence, in the county of Providence and State of Rhode Island, have invented certain new and useful Improvements in Motocycles, of which the following is a specification.

My invention relates to improvements in motocycles; and it consists in providing a cycle or other device intended for carriage or transportation purposes with a motor mechanism composed of a gas-engine and an electric motor and a power-generator adapted to generate and supply the gas and electricity required to supply the gas-engine and motor mechanisms and in so arranging and combining the same with the cycle or like device as will make a whole apparatus operative and complete in construction and efficient and economical in its operation.

The object of my invention is to provide cycles, carriages, or the like with a light, compact, and effective motor mechanism and to combine therein the requisite and maximum degree of capacity with the minimum of weight and size and to accomplish such other desirable ends incidental thereto, as will be more fully explained hereinafter and will be referred to more particularly in the claims.

Figure 5:
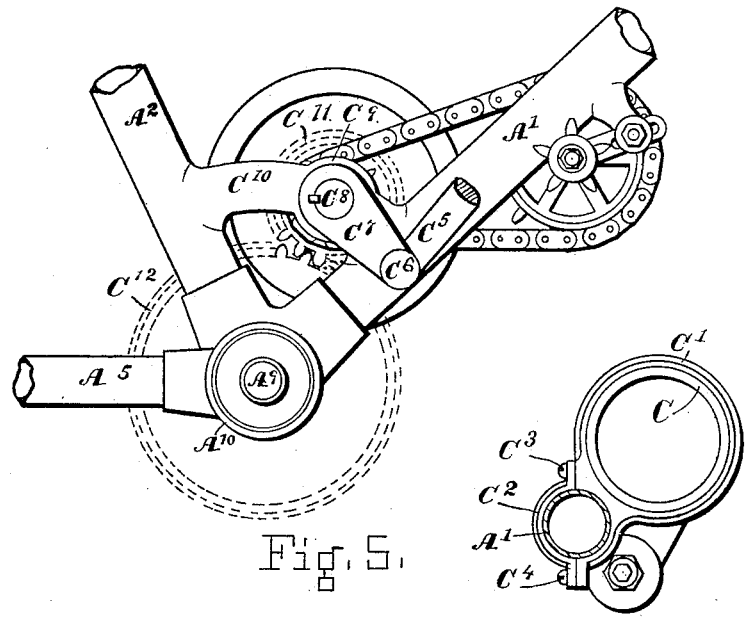
Figure 4:
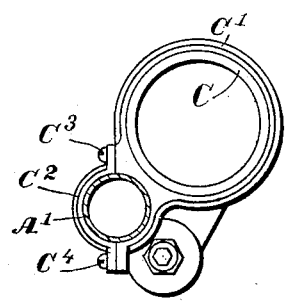
Figure 6:
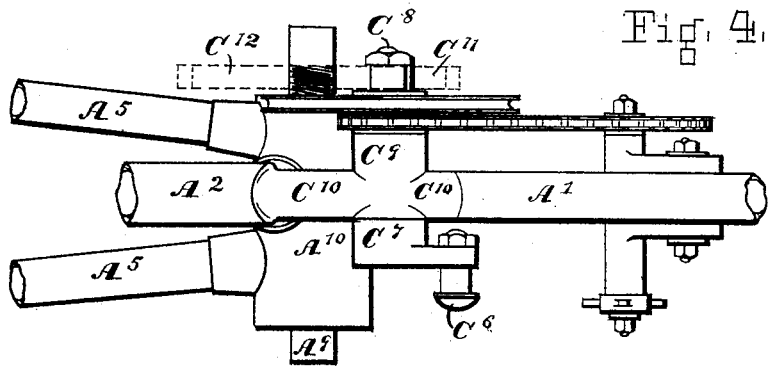
Figure 7:
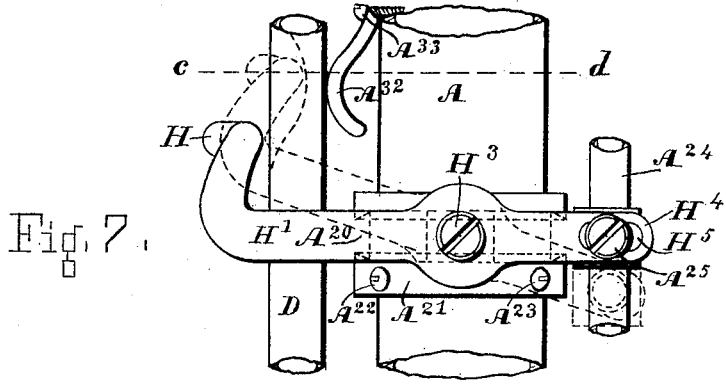
Figure 8:
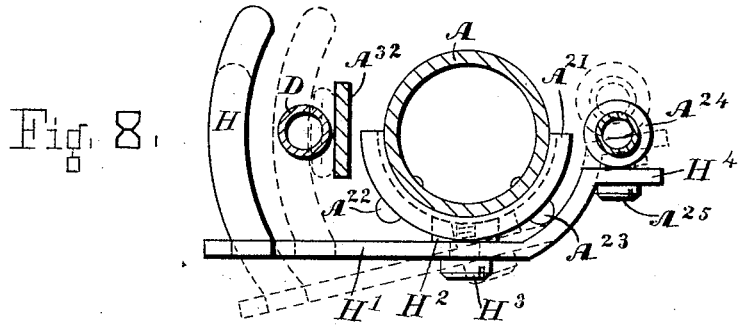
Figure 10:
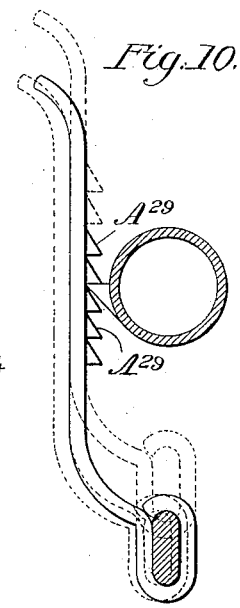
Figure 9:
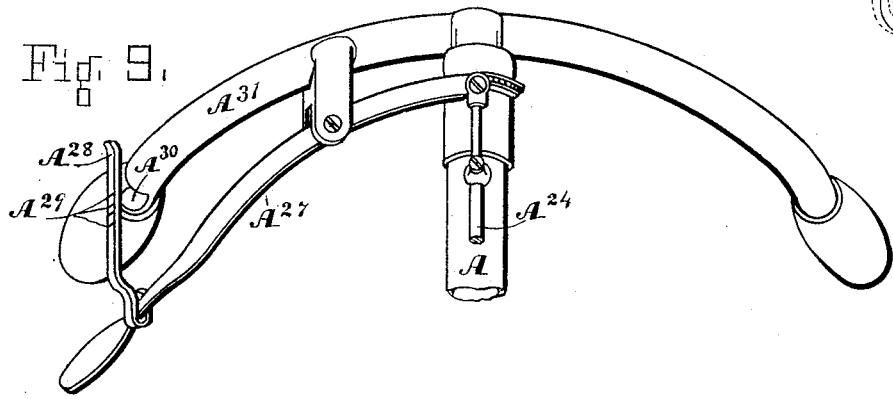

In the accompanying drawings, and in which similar letters refer to similar parts throughout the several views, which are part of this specification and are to be taken in connection therewith, Figure 1 represents a side elevation of a cycle provided with my invention. This figure shows the power-generator, consisting of a series of hydrogen-gas and electricity generating cups secured at the upper part of the frame in a basket or holder which carries them and which is secured to the frame, as will be more fully described hereinafter. The gas-engine mechanism and the electric motor are also shown in their respective positions on other portions of the frame and to which they are suitably connected. The connections between the generator and the engine and motor are also represented, and the devices for controlling the supply of the gas and electricity thereto are also herein shown. Fig. 2 represents a side elevation of the basket or carrier for the generators and its means of support by and connections with the frame of the cycle and is shown of enlarged size for purposes of clearness of description. Fig. 3 is a top sectional view on the line $a\,b$ in Fig. 2. Fig. 4 represents a rear end view of the gas-engine cylinder and intended to show the means of connecting the engine mechanism to another portion of the cycle-frame. Fig. 5 represents a side view of the crank-shaft mechanism and the valve-chain-actuating mechanism as connected with and supported by the cycle-frame. This figure also shows the gear mechanism by which the power of the engine is applied to the pedal or to the crank-shaft of the cycle. Fig. 6 is a top view of Fig. 5. Fig. 7 is a side elevation of the gas-cut-off mechanism which regulates the supply of gas to the engine and its connection with the cycle-frame and is shown as of enlarged size. Fig. 8 is a top sectional view of Fig. 7 on the line $c\,d$. Fig. 9 is a front elevation of the handle-bar mechanism of the cycle and shows in connection with the brake-handle a ratchet connection with the handle-bar by means of which the gas-cut-off mechanism is controlled in its position. Fig. 10 represents a full-size side elevation of the ratchet-bar mechanism and the detent upon the handle-bar by means of which the control of the flow of the gas to the gas-engine may be effected. In this figure the teeth of the ratchet-bar can be clearly seen as they engage with the detent on the handle-bar.

In the drawings, A, $A'$, $A^2$, $A^3$, $A^4$, and $A^5$ represent the several parts of the frame of a cycle, consisting of the steering-head, the lower center, the upright, the upper center, the upper rear fork, and the lower rear fork, respectively, and to which the wheels $A^6$ $A^7$ are journaled through the steering-fork mechanism $A^8$ and the rear forks $A^4$ $A^5$ in the usual manner.

The cycle is provided with the pedal or crank shaft $A^9$, having bearings in the crankshaft bracket $A^{10}$, as in the customary manner of cycles provided with the common pedals and pedal-shaft mechanism intended for propulsion by foot-power riding exclusively.

The generators B B B are mounted in a basket B', which is secured to the upper portion of the cycle-frame by means of a bracket $A^{11}$ upon the lower center $A'$ and a bracket $A^{12}$ upon the upright $A^2$, having the screws $A^{13}$ $A^{14}$ connected therewith and the bottom $B^2$ of the basket B' resting upon the upper portion $A^{15}$ of the bracket $A^{11}$ and against the screws $A^{13}$ $A^{14}$, respectively, in the bracket $A^{12}$ upon the upright $A^2$. The upper part $B^3$ of the basket B' is provided with handles $B^4$ $B^5$, which fit into a recess $A^{16}$ in a spur $A^{17}$ upon the upright $A^2$, and another spur $A^{18}$ upon the head A, having a corresponding opening $A^{19}$ for the purpose, respectively. This arrangement of construction admits of the removal of the basket, together with the generators, by elevating the same so that the handle will clear the spurs, and the basket can be then removed, or by removing the screws $A^{13}$ $A^{14}$ in the bracket $A^{12}$ the left-hand end can be depressed and the basket subsequently manipulated for its removal.

C represents a gas-engine-cylinder mechanism adapted to be actuated by gas generated in the generators B B B and from which it receives its supply through the duct D. The cylinder is secured to the lower center tube $A'$ of the cycle-frame by means of the brackets $C'$ $C^2$, each of which is provided with a cap $C^2$ and screws $C^3$ $C^4$ therefor, as shown in Fig. 4.

The connecting-rod $C^5$ of the engine C is connected, through crank-pin $C^6$ and crank $C^7$, with the engine crank-shaft $C^8$, having a bearing $C^9$, which is connected to the lower center $A'$ and upright $A^2$ by means of a bridge $C^{10}$, which may be brazed to the two parts $A'$ $A^2$ of the cycle-frame or otherwise connected in any desirable way. The engine crank-shaft $C^8$ is provided with a gear $C^{11}$, which meshes in another gear $C^{12}$, which is secured to the pedal-shaft $A^9$ and through which the power of the engine may be imparted to the latter.

Secured to the upright $A^2$ is an electric motor E, by means of screws $E'$ $E^2$, in substantially the same manner as that in which the engine is secured to the frame, as already described. The motor may be of any desired form of construction and is connected with the electric mechanism of the generators by the conductors F F', having the switch $F^2$ in circuit therewith and by means of which the current to the motor may be controlled. A belt $E^3$ connects the motor-shaft mechanism with the crank-shaft $C^8$ by a pulley $E^4$, which is mounted on the latter and through which the power of the motor may be imparted to it and through it to the pedal-shaft $A^9$ of the cycle.

The electric conductors F F' have a loop $F^3$ $F^4$, in which an induction-coil G is placed in circuit, having the conductors $F^5$ $F^6$, through which the electrodes of the engine and the coil are placed in circuit and by means of which the requisite igniting-sparks are produced in the engine.

The hydrogen gas generated by the generators B B B and supplied to the engine through the duct D is controlled by means of the cut-off H, which is integral with the lever H', which is pivoted to the block $H^2$ by means of the pivot-screw $H^3$. The block $H^2$ has a sliding fit in a dovetailed-shaped annular groove $A^{20}$ in the outside of the arc-shaped carrier $A^{21}$, which is secured to the head A by means of the screws $A^{22}$ $A^{23}$, and which construction admits of the block $H^2$, with the cut-off mechanism connected thereto, having a limited movement around the head A, as well as providing a vertical movement for the cut-off H and also a movement toward the head. The front end $H^4$ of the lever H' is loosely connected with the brake-rod $A^{24}$ of the cycle by means of the screw-stud $A^{25}$, which is fitted in the latter and which also fits in an elongated aperture $H^5$ in the lever H', so that by the vertical movement of the rod $A^{24}$, as in actuating the brake $A^{26}$ of the cycle, the cut-off mechanism can be likewise operated.

The brake-lever $A^{27}$ is provided with a ratchet-bar $A^{28}$, having a series of teeth $A^{29}$, which are adapted to engage with a detent $A^{30}$ on the handle-bar $A^{31}$, so that whenever the brake-handle is drawn against the handle-bar the detent will secure the ratchet-bar, and consequently the brake-rod mechanism, in a fixed position. The brake-rod mechanism may be released by raising the ratchet-bar $A^{28}$ so that its teeth will clear the detent $A^{30}$.

The pivoted connection of the brake-lever $A^{27}$ gives the brake-rod $A^{24}$ a slight lateral movement around the head A, as indicated by the dotted lines in Fig. 8, which carries the cut-off-lever mechanism with it and which is provided for by the sliding fit of the block $H^2$ in the groove $A^{20}$ in the carrier $A^{21}$, as already described.

A bolster or spring $A^{32}$ is secured to the head A by a screw $A^{33}$ and in the proper relative position with the cut-off H. By depressing the brake-rod mechanism through the brake-lever mechanism, as described, it can be seen that the cut-off H moves toward the bolster $A^{32}$, and between which and the cut-off the gas-duct D is located. This movement of the cut-off H causes it to press against the duct D, which may be of rubber or other flexible tubing material, and to compress the latter against the bolster and close it together, as indicated by the dotted lines in Fig. 8. It will be thus retained in this position in a fixed manner until released by the manipulation of the ratchet-bar $A^{28}$, as already described. In this way the supply of the gas to the engine can be regulated and controlled by the rider as easily and quickly as the brake mechanism alone can be operated and simultaneously with it.

The free end D' of the gas-duct D is provided with a spring-clip $D^2$, which, by compressing the duct together in a manner similar to that in which the cut-off H acts, answers the purpose of preventing the escape of the gas in that direction, except when desired, and which then may be effected by the removal of the clip from the duct, thus leaving that end of the duct open for the unobstructed egress of the gas. This arrangement provides a simple and very accessible means of allowing the gas to escape when the same is generating and is not needed for use in the engine.

The nature of the system of generating and using hydrogen gas and electricity as a motive power in connection with this invention can be more fully understood by referring to another invention of mine, for which Letters Patent No. 583,104 were granted to me on May 25, 1897, entitled "System of generating and using hydrogen gas and electricity," and the character of the construction and operation of the gas-engine mechanism herein referred to can also be more clearly understood by referring to Letters Patent No. 577,567, dated February 23, 1897, entitled "Gas-engine," which were also granted to me for said invention.

The power delivered to the pedal-shaft $A^9$ is transmitted through its sprocket-wheel $A^{34}$, the endless chain $A^{35}$, and the sprocket-wheel $A^{36}$ on the driving-shaft, hub, axle, or other connection $A^{37}$ (as the case may be) of the driving-wheel $A^7$ to the latter, and thus causes the propulsion of the cycle, as in the case of cycles adapted for foot-power application exclusively.

The operation of my invention will now be described. The generators are charged by preparing each of the cups with its respective components of electrodes and dilute sulfuric-acid solution and adjusting them in position in the basket by means of its fastenings to the cycle-frame, as already described. The gas and electrical connections with the engine and electric-motor devices are then adjusted and the whole apparatus is ready for use, as the gas and electricity commence to generate as soon as the connections are complete. The rider may then mount the cycle and commence to ride it, as with an ordinary cycle, by operating the pedal-shaft mechanism, and which causes the engine mechanism, through the gear connections therewith, to operate simultaneously with the movement of the cycle. This gives the start to the engine requisite to the operation of gas-engines generally and without the necessity of having or using a balance-wheel, as ordinarily required.

At the same time electricity is generated in the generators, and the circuit through the induction-coil and engine-electrodes being complete the electric sparks are produced within the engine that are necessary for the ignition of the gas. The electric motor, which receives the larger part of the electric current generated in the generators, converts it into mechanical power, which is transmitted through its belt connection to the engine crank-shaft, and with the engine coöperates in supplying power to the pedal-shaft of the cycle and thus cause the propulsion of the latter. The electric current is controlled by the switch on the upper center of the cycle-frame and convenient for access to the rider. The gas-supply to the engine is equally well under his control, as the same manipulation as that required for the operation of the brake mechanism actuates the cut-off devices, as already explained, and by reason of the elastic character of the bolster-spring, against which the cut-off compresses the gas-duct, the utility of the brake mechanism is not otherwise affected or impaired. In other words, the bolster-spring will resist the pressure of the cut-off sufficiently to completely close the duct by compression, but will yield to allow the brake to come in contact with the wheel-tire to effect the requisite braking power on the latter when desired.

The motor-shaft can be provided with a loose pulley for its belt connection, so as to allow it to remain at rest without removing the belt, while the cycle is being used with foot-power exclusively or in connection with the power of the engine mechanism.

The engine mechanism can be disconnected by removing one of the gears connecting the pedal-shaft with the crank-shaft, when desired, and the cycle is to be used by foot-power alone.

The advantage of this invention consists of the manner in which the necessary power generating and connecting mechanisms are devised, and in the minimum size, weight, and compact construction thereof, and in the means of connecting the same to the frame of the device without changing, only in a very slight degree, the ordinary style and make of foot-power cycles, and in effecting these results without causing interference with the movements of the rider in any way.

The method of generating both gas and electricity in the same generators and providing mechanism for their joint conversion into dynamic power and its application to the propulsion of a cycle or like device is new and of great economy and advantage as well.

My invention has been referred to as adapted to a cycle; but it can be seen that it can be applicable to any kind of a bicycle, tricycle, motocycle, carriage, or device for transportation purposes in which power is required and which can provide for the support of the generators and engine and motor mechanisms and having a driving-shaft with which the said mechanisms can be connected.

Having thus described my invention, what

I claim, and desire to secure by Letters Patent, is—

1. In a cycle, the combination of a generator of gas and electricity, a gas-engine mechanism secured to the cycle-frame and having a duct connection with the gas-generating apparatus of the generator and having means for transmitting the power of its crank-shaft to the pedal-shaft of the cycle, an electric motor having conductor connections with the electrodes of the generator and having means for transmitting its power to the pedal-shaft of the cycle, and the pedal-shaft having a connection with the driving-wheel shaft of the cycle, substantially as specified.

2. In a cycle, the combination of a generator of gas and electricity, a gas-engine mechanism secured to the cycle-frame, an electric motor also secured to the cycle-frame, a gas-duct connecting the generator with the gas-engine and having a cut-off mechanism therefor, electric conductors connecting the generator with the electric motor, and having a switch mechanism therein, a crank-shaft for the engine having a pulley-and-belt connection with the electric-motor shaft and means for transmitting its power to the cycle-wheel-driving shaft, and the cycle-wheel-driving-shaft mechanism connected with the crank-shaft mechanism, substantially as specified.

3. In a cycle, the combination of a generator of gas and electricity, a gas-engine mechanism secured to the cycle-frame, an electric motor also secured to the cycle-frame, a gas-duct connecting the generator with the gas-engine, electric conductors connecting the generator with the electric motor, and having an induction-coil in circuit therewith, electric conductors connecting the induction-coil with the electrodes of the gas-engine, a crank-shaft for the engine having means for transmitting its power to the cycle pedal-shaft and having means for receiving the power of the electric motor, and the pedal-shaft having means for transmitting its power to the driving-shaft of the cycle-wheel, substantially as specified.

4. In a cycle, the combination of a generator of gas and electricity, a gas-engine mechanism secured to the cycle-frame, a gas-duct connecting the generator with the engine, electric conductors connecting the generator with the igniting-electrodes of the engine and the engine provided with means for transmitting its power to the driving-wheel of the cycle, substantially as specified.

5. In a cycle, the combination of a generator of gas and electricity, a gas-engine mechanism secured to the cycle-frame, a gas-duct connecting the generator with the engine, electric conductors connecting the generator with the igniting-electrodes of the engine and having a spark-coil mechanism in circuit therewith, and the engine provided with means for transmitting its power to the driving-wheel of the cycle, substantially as specified.

6. In a cycle, the combination of a generator of gas and electricity, a gas-engine mechanism and an electric motor having connections with the gas and electric generating devices of the generator and having means for transmitting their united power to the driving-wheel mechanism of the cycle, substantially as specified.

7. In a cycle, the combination of a generator of gas, an engine mechanism secured to the frame of the cycle, a gas-duct connecting the generator with the engine provided with a cut-off mechanism for controlling the supply of the gas to the engine, the crank-shaft having a bearing connected with the cycle-frame and having means for transmitting its power to the pedal-shaft, and the pedal-shaft having a driving-wheel mechanism and having means for receiving the power of the crank-shaft, substantially as specified.

8. In a cycle, the combination of a generator of gas, an engine mechanism secured to the frame of the cycle, a gas-duct connecting the generator with the engine provided with a cut-off mechanism for controlling the supply of the gas to the engine, and which is actuated by the brake mechanism of the cycle, the crank-shaft having a bearing connected with the cycle-frame and having means for transmitting its power to the pedal-shaft, and the pedal-shaft having a driving-wheel mechanism and having means for receiving the power of the crank-shaft, substantially as specified.

9. In combination with the frame of a cycle, having a gas-generator and an engine mechanism connected therewith, a cut-off device adapted to control the supply of the gas in the duct leading to the engine, and a bolster mechanism adapted to receive the pressure of the duct when compressed by the cut-off mechanism and to thereby cause the prevention of the flow of the gas to the engine through the duct, substantially as specified.

10. In a cycle having a power mechanism consisting of a generator of gas and electricity, a gas-engine and an electric motor, secured thereto, the generator mechanism secured to the cycle-frame by means of the bracket mechanism connected with the head, and another bracket mechanism secured to the upright, and adapted to support the generator mechanism in position therewith, substantially as specified.

11. In a cycle having a power mechanism consisting of a generator of gas and electricity, a gas-engine and an electric motor, secured thereto, the generator mechanism secured to the cycle-frame by means of the bracket mechanism and the spur device connected with the head, and another bracket mechanism and spur device secured to the upright and by means of which, the generator mechanism is secured and retained in position and in a detachable manner therewith, substantially as specified.

12. In a cycle, a frame having generator-supporting devices consisting of a bracket and a spur device secured to the head portion thereof, and a spur and a bracket provided with screw-support for the generator secured to the upright section thereof, and by means of which the generator-carrier can be detachably connected therewith, substantially as specified.

13. The means for propelling a motocycle consisting of a combined generator of gas and electricity connected with a suitable section thereof, and a gas-engine, an electric motor connected therewith and each of which is adapted to convert the gas and electricity from the generator into dynamic power and having means for transmitting said power to the driving-wheel mechanism of the device, substantially as specified.

Signed at Brooklyn, in the county of Kings and State of New York, this 5th day of December, A. D. 1895.

LUTHER H. WATTLES.

Witnesses:
G. W. IRWIN,
JAMES A. McBAIN.